(12) United States Patent
Miyakoshi et al.

(10) Patent No.: US 11,416,797 B2
(45) Date of Patent: Aug. 16, 2022

(54) RESOURCE MANAGEMENT SYSTEM, INFORMATION PROCESSING DEVICE, AND RESOURCE MANAGEMENT METHOD

(71) Applicant: Hitachi, Ltd., Tokyo (JP)

(72) Inventors: Junichi Miyakoshi, Tokyo (JP); Yasuyuki Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/908,895

(22) Filed: Jun. 23, 2020

(65) Prior Publication Data

US 2021/0065088 A1 Mar. 4, 2021

(30) Foreign Application Priority Data

Aug. 29, 2019 (JP) .............................. JP2019-157034

(51) Int. Cl.
| | |
|---|---|
| *G06Q 10/06* | (2012.01) |
| *H04Q 9/02* | (2006.01) |
| *G06Q 50/06* | (2012.01) |
| *G06Q 30/02* | (2012.01) |
| *G06Q 10/04* | (2012.01) |

(52) U.S. Cl.
CPC ....... *G06Q 10/06315* (2013.01); *G06Q 10/04* (2013.01); *G06Q 30/0203* (2013.01); *G06Q 50/06* (2013.01); *H04Q 9/02* (2013.01); *H04Q 2209/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0145534 A1* | 6/2010 | Forbes, Jr | .............. | G06Q 10/00 700/291 |
| 2011/0184581 A1* | 7/2011 | Storch | .................... | G06Q 50/06 700/295 |
| 2013/0268126 A1* | 10/2013 | Iwami | ...................... | F24F 11/30 700/276 |
| 2014/0316958 A1* | 10/2014 | Alberth, Jr | ............ | G07F 15/005 705/35 |
| 2018/0172309 A1 | 6/2018 | Niikura | | |
| 2019/0165579 A1* | 5/2019 | Ichien | ............... | H02J 13/00004 |

FOREIGN PATENT DOCUMENTS

JP 2016-217599 A 12/2016

* cited by examiner

*Primary Examiner* — Arif Ullah
(74) *Attorney, Agent, or Firm* — Mattingly & Malur, PC

(57) ABSTRACT

A resource management system, which manages a resource consumed by a user, includes: a processor that executes a program; and a storage device that stores the program. The processor executes: a resource consumption amount acquisition process of acquiring a resource consumption amount of the user; a user characteristic estimation process of estimating characteristics of the user based on the resource consumption amount; a target calculation process of calculating a target value related to the resource consumption amount for which the user needs to cooperate based on the characteristics of the user estimated by the user characteristic estimation process; a cooperation request generation process of generating cooperation request data related to reduction of the resource consumption amount for the user based on the target value calculated by the target calculation process; and an output process of outputting the cooperation request data generated by the cooperation request generation process.

3 Claims, 17 Drawing Sheets

| Q | CONTENT |
|---|---------|
| 1 | WHAT LEVEL OF PHYSICAL COMFORT LEVEL DO YOU OBTAIN FROM CURRENT RESOURCE CONSUMPTION? (ENTER 0 TO 100%) |
| 2 | HOW MUCH MORE RESOURCES DO YOU NEED TO MAKE COMFORT LEVEL 100%? (ENTER BETWEEN 1 TO 5 TIMES) |
| 3 | IF YOU SUPPRESS RESOURCE CONSUMPTION, WHAT IS MONETARY RATIO AS REASON THEREOF? (ENTER 0 TO 100%) |

FIG. 9

| | 901 | | | 902 | |
|---|---|---|---|---|---|
| RESOURCE CONSUMPTION AMOUNT (911) | COMFORT LEVEL (912) | SUPPRESSION TENDENCY (913) | MONETARY RATIO (914) | USER PERCEPTION (921) | TYPE (922) |
| LARGE | HIGH | LOW | SMALL | TENDENCY TO WASTE MONEY CARELESSLY | A |
| LARGE | LOW | HIGH | SMALL | ENERGY-SAVING AWARENESS IS HIGH BUT INEFFICIENT | B |
| SMALL | HIGH | HIGH | SMALL | ENERGY-SAVING BEHAVIOR HAS BEEN EASILY ESTABLISHED | C |
| SMALL | LOW | HIGH | LARGE | FINANCIALLY STRAPPED AND PATIENCE TENDENCY | D |
| .. | .. | .. | .. | .. | .. |

# RESOURCE MANAGEMENT SYSTEM, INFORMATION PROCESSING DEVICE, AND RESOURCE MANAGEMENT METHOD

CLAIM OF PRIORITY

The present application claims priority from Japanese patent application JP 2019-157034 filed on Aug. 29, 2019, the content of which is hereby incorporated by reference into this application.

BACKGROUND OF THE INVENTION

1. Field of the Invention

The present invention relates to a resource management system that manages a resource, an information processing device, and a resource management method.

2. Description of the Related Art

JP 2016-217599 A discloses a management apparatus for a plurality of air conditioning apparatuses capable of more stably acceding to a power consumption amount adjustment request. In this management apparatus, when there exists an air conditioning apparatus of a consumer for which a cancellation probability of a power consumption amount adjustment request or the like is high at the time point after an allocation plan for a reduction load has been tentatively determined, a controller of an aggregator lowers a distribution priority order for the consumer having the high cancellation probability, and distributes the request to another consumer, to thereby redistribute the allocation plan for the reduction load.

SUMMARY OF THE INVENTION

However, the management apparatus of JP 2016-217599 A does not consider resource distribution according to individual characteristics for each user or the utility of the entire community.

An object of the present invention is to realize a demand response that considers a utility of resource consumption for an individual and a utility of resource consumption in the entire community.

A resource management system as one aspect of the invention disclosed in the present application is a resource management system that manages a resource consumed by a user and includes a processor that executes a program, and a storage device that stores the program. The processor executes: a resource consumption amount acquisition process of acquiring a resource consumption amount of the user; a user characteristic estimation process of estimating a utility characteristic related to a utility that the user has obtained, and a suppression characteristic of the user in which the utility decreases as the resource consumption amount increases, based on the resource consumption amount; a target calculation process of calculating a target value related to the resource consumption amount for which the user needs to cooperate based on the utility characteristic and the suppression characteristic of the user estimated by the user characteristic estimation process; a cooperation request generation process of generating cooperation request data related to reduction of the resource consumption amount for the user based on the target value calculated by the target calculation process; and an output process of outputting the cooperation request data generated by the cooperation request generation process.

According to a representative embodiment of the present invention, it is possible to realize a demand response that considers the utility of resource consumption for an individual and the utility of resource consumption in the entire community. Other objects, configurations, and effects which have not been described above will become apparent from embodiments to be described hereinafter.

BRIEF DESCRIPTION OF THE DRAWINGS

FIG. 9 is an explanatory view illustrating an example of a user perception estimation table;

DESCRIPTION OF THE PREFERRED EMBODIMENTS

First Embodiment

A demand response for demand suppression when supply of natural energy is insufficient due to fluctuations in the amount of supply of the natural energy is important in order to realize local production for local consumption of the natural energy for the purpose of economic revitalization of a community. In order to realize the demand response, there is a case where a usage fee of the natural energy is increased or an incentive (for example, a coupon) is provided to a saving cooperator so as to suppress the demand when the supply is insufficient.

If the usage fee is increased, the demand for the natural energy is suppressed, but a burden for financially strapped people is generated, so that a utility of energy consumption in the entire community is reduced. Further, it is difficult to consider differences in individual perceptions regarding the provision of the incentive so that the effect varies, for example, as there are people who do not require a coupon. For this reason, the first embodiment realizes the demand response that considers a utility of energy consumption for an individual and a utility of energy consumption in the entire community. Hereinafter, a description will be given with reference to the attached drawings.

<System Configuration Example>

Figure 1:
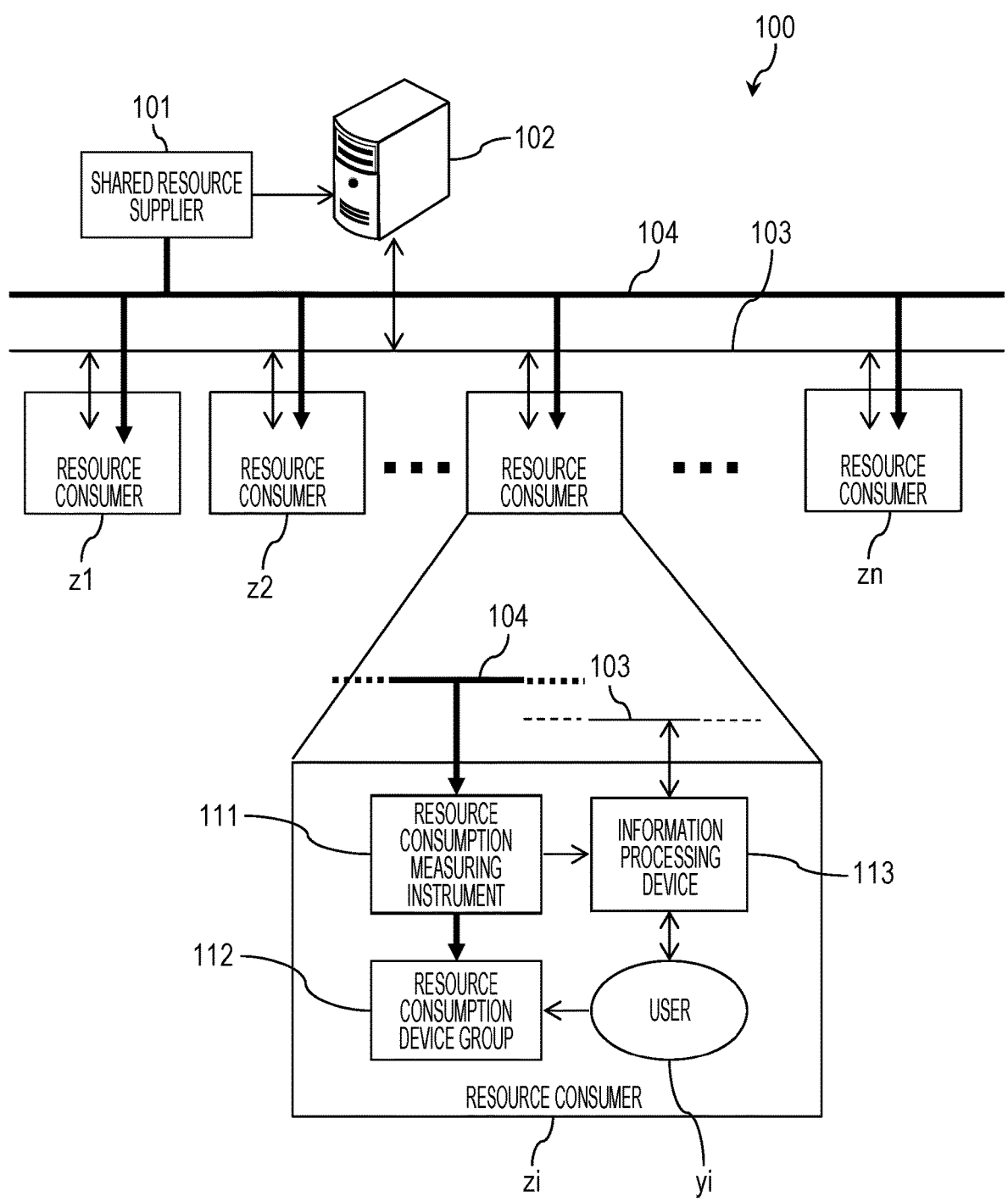
FIG. 1 is a block diagram illustrating a system configuration example of a resource management system according to a first embodiment.

FIG. 1 is a block diagram illustrating a system configuration example of a resource management system according to the first embodiment. A resource management system 100 includes a target calculation device 102 and one or more (n in FIG. 1, and n is an integer of one or more) resource consumers z1 to zn. The target calculation device 102 and the resource consumer zi (i is an integer satisfying $1 \leq i \leq n$) are connected via a communication network 103 such as the Internet so as to be capable of communicating with each other. The resource management system 100 also includes a shared resource supplier 101. The target calculation device 102 and the shared resource supplier 101 are connected via the communication network 103 so as to be capable of communicating with each other.

The shared resource supplier 101 is a supply source that supplies a shared resource to the resource consumer zi, and is, for example, a hydroelectric power plant, a wind power plant, a solar power plant, a thermal power plant, or a nuclear power plant. An example of the shared resource is electric power. The shared resource supplier 101 is connected to the resource consumer zi via a power network 104 that transmits power.

The target calculation device 102 is a computer that manages the shared resource to the resource consumers zi. The resource consumer zi exists for each household, and is used by a household user yi. The resource consumer zi includes a resource consumption measuring instrument 111, a resource consumption device group 112, and an information processing device 113. The resource consumption measuring instrument 111 is, for example, a wattmeter, and measures a power consumption amount of the resource consumption device group 112. The resource consumption device group 112 is a set of resource consumption devices. The resource consumption device is a device that consumes power such as air conditioning equipment (an air conditioner), a refrigerator, an illumination device, and a television. The information processing device 113 is a computer that provides a user with data related to resource management.

<Hardware Configuration Example of Computer>

Figure 2:
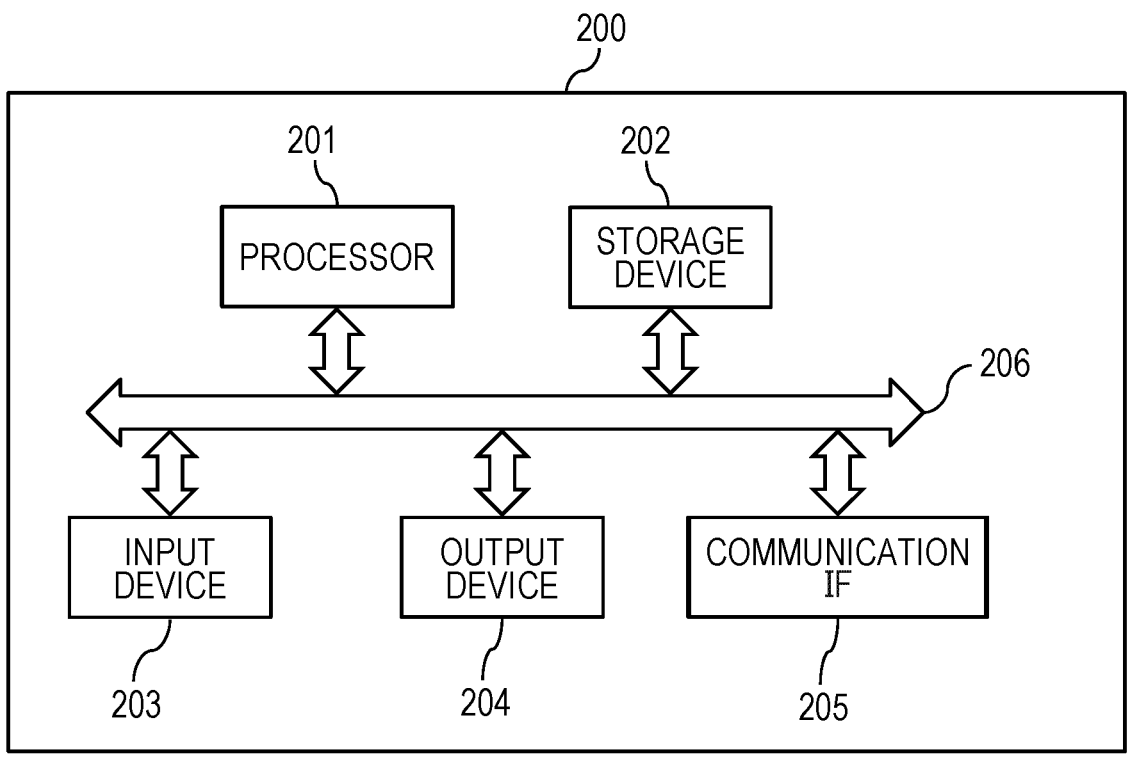
FIG. 2 is a block diagram illustrating a hardware configuration example of a computer (a target calculation device and an information processing device)

FIG. 2 is a block diagram illustrating a hardware configuration example of a computer. A computer (the target calculation device 102 and the information processing device 113) 200 includes a processor 201, a storage device 202, an input device 203, an output device 204, and a communication interface (communication IF) 205. The processor 201, the storage device 202, the input device 203, the output device 204, and the communication IF 205 are connected via a bus 206. The processor 201 controls the computer 200. The storage device 202 serves as a work area of the processor 201. Further, the storage device 202 is a non-transitory or transitory recording medium that stores various types of programs and data. Examples of the storage device 202 include a read only memory (ROM), a random access memory (RAM), a hard disk drive (HDD), and a flash memory. The input device 203 inputs data. Examples of the input device 203 include a keyboard, a mouse, a touch panel, a numeric keypad, a scanner, and a microphone. The output device 204 outputs data. Examples of the output device 204 include a display, a printer, and a speaker. The communication IF 205 is connected to a communication network 103 to perform transmission and reception of data.

<Functional Configuration Example of Information Processing Device 113>

Figure 3:
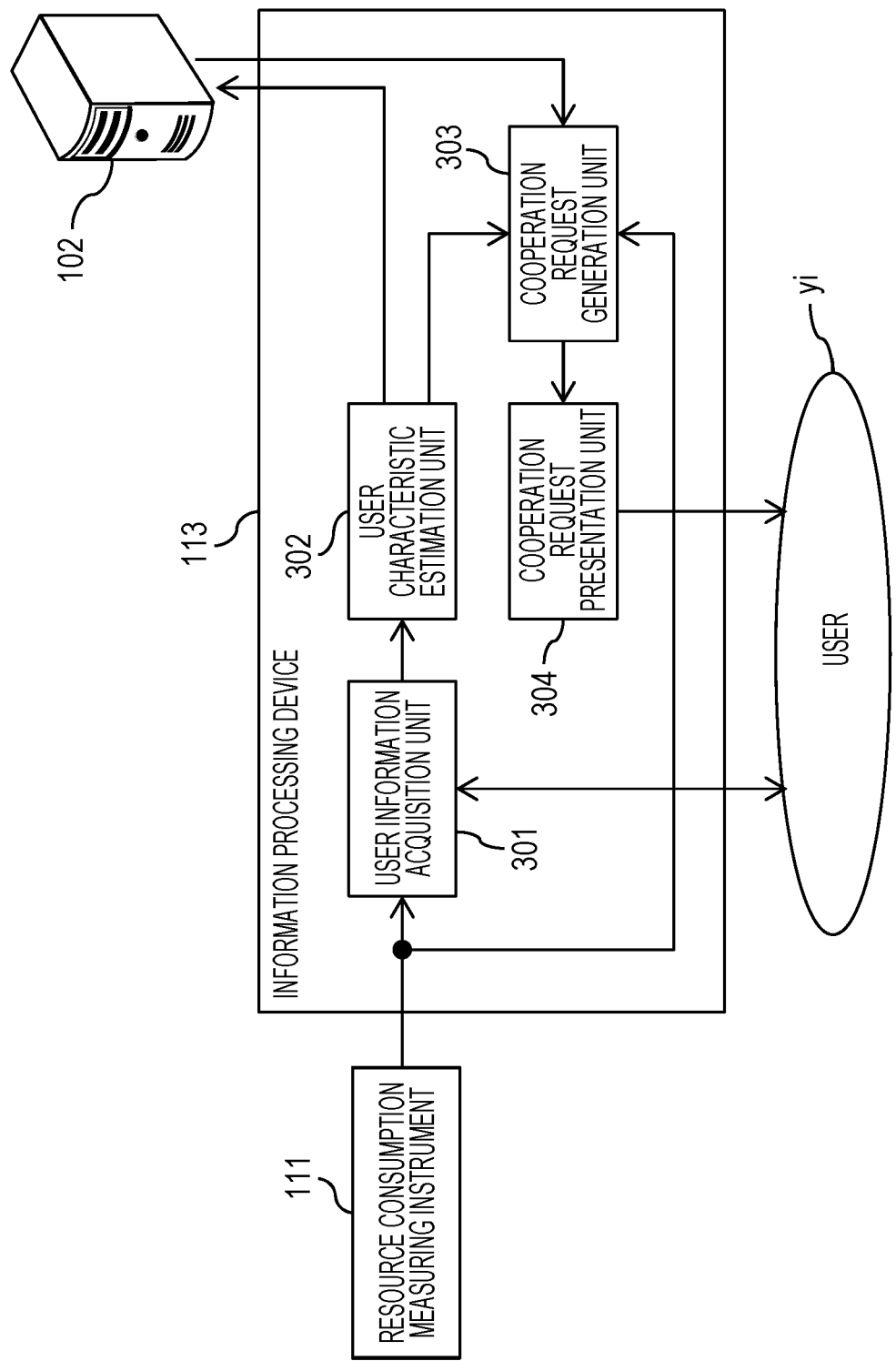
FIG. 3 is a block diagram illustrating a functional configuration example of the information processing device.

FIG. 3 is a block diagram illustrating a functional configuration example of the information processing device 113. The information processing device 113 includes a user information acquisition unit 301, a user characteristic estimation unit 302, a cooperation request generation unit 303, and a cooperation request presentation unit 304. Specifically, the user information acquisition unit 301, the user characteristic estimation unit 302, the cooperation request generation unit 303, and the cooperation request presentation unit 304 are, for example, functions realized as the processor 201 executes the program stored in the storage device 202 illustrated in FIG. 2.

The user information acquisition unit 301 acquires user information. The user characteristic estimation unit 302 estimates a user characteristic. In the present application, "estimation" is a process of determining prediction data of an object to be estimated. In the case of the user characteristic estimation unit 302, the user characteristic estimation unit 302 determines the user characteristic which is the prediction data of the object to be estimated. The cooperation request generation unit 303 generates cooperation request data. The cooperation request presentation unit 304 presents the cooperation request data generated by the cooperation request generation unit 303 to the user yi. Specifically, for example, the cooperation request presentation unit 304 displays the cooperation request data on a screen or outputs a sound from the output device 204.

Figures 4, 5:
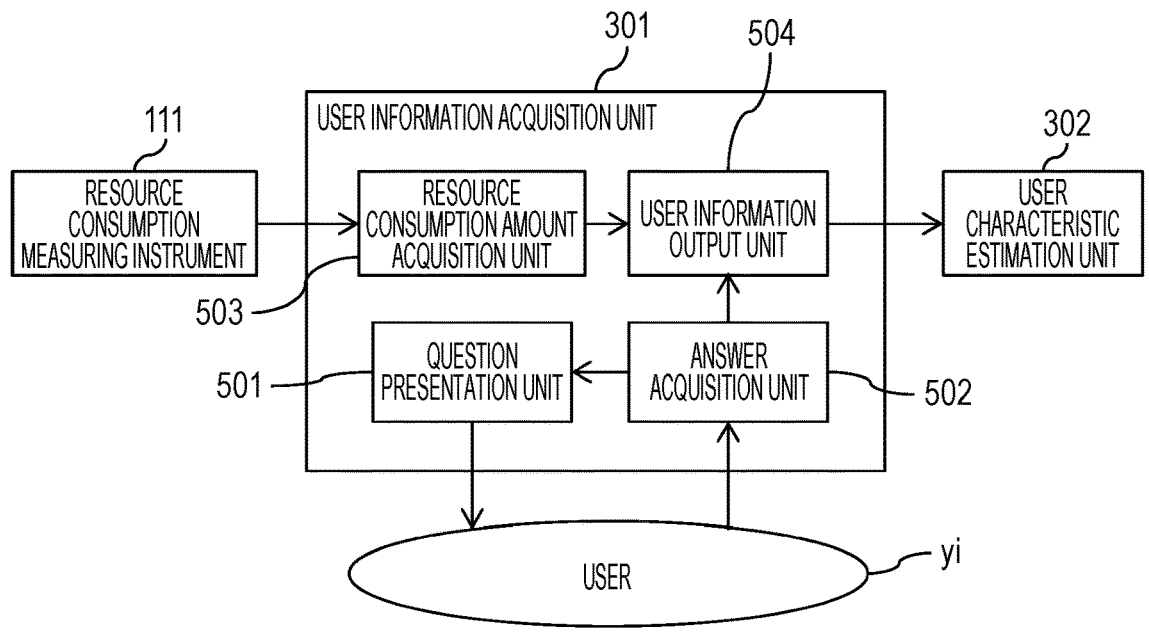
FIG. 4 is a block diagram illustrating a detailed functional configuration example of a user information acquisition unit illustrated in FIG. 3.
FIG. 5 is an explanatory view illustrating an example of a question table held by a question presentation unit.

FIG. 4 is a block diagram illustrating a detailed functional configuration example of the user information acquisition unit 301 illustrated in FIG. 3. The user information acquisition unit 301 includes a question presentation unit 501, an answer acquisition unit 502, a resource consumption amount acquisition unit 503, and a user information output unit 504. The question presentation unit 501 presents a question from the output device 204.

FIG. 5 is an explanatory view illustrating an example of a question table held by the question presentation unit 501. The question table 500 is a table that stores a character string representing a question. The question presentation unit 501 displays each question (questions Q1 to Q3 in FIG. 5) of the question table 500 on a screen or outputs a sound from the output device 204.

Returning to FIG. 4, the answer acquisition unit 502 acquires a user's answer to a question from the input device 203 as a result of presenting the question by the question presentation unit 501. Specifically, for example, the answer acquisition unit 502 acquires a numerical value between "0 to 100" % for the question Q1, a numerical value between "1 to 5" times for the question Q2, and a numerical value between "0 to 100" % for the question Q3 as the user's answer.

The resource consumption amount acquisition unit 503 acquires a resource consumption amount (for example, the amount of power) for each of the resource consumption devices from the resource consumption measuring instrument 111. The user information output unit 504 outputs user information, which includes the answer acquired by the answer acquisition unit 502 and the resource consumption amount acquired by the resource consumption amount acquisition unit 503, to the user characteristic estimation unit 302.

Figure 6:
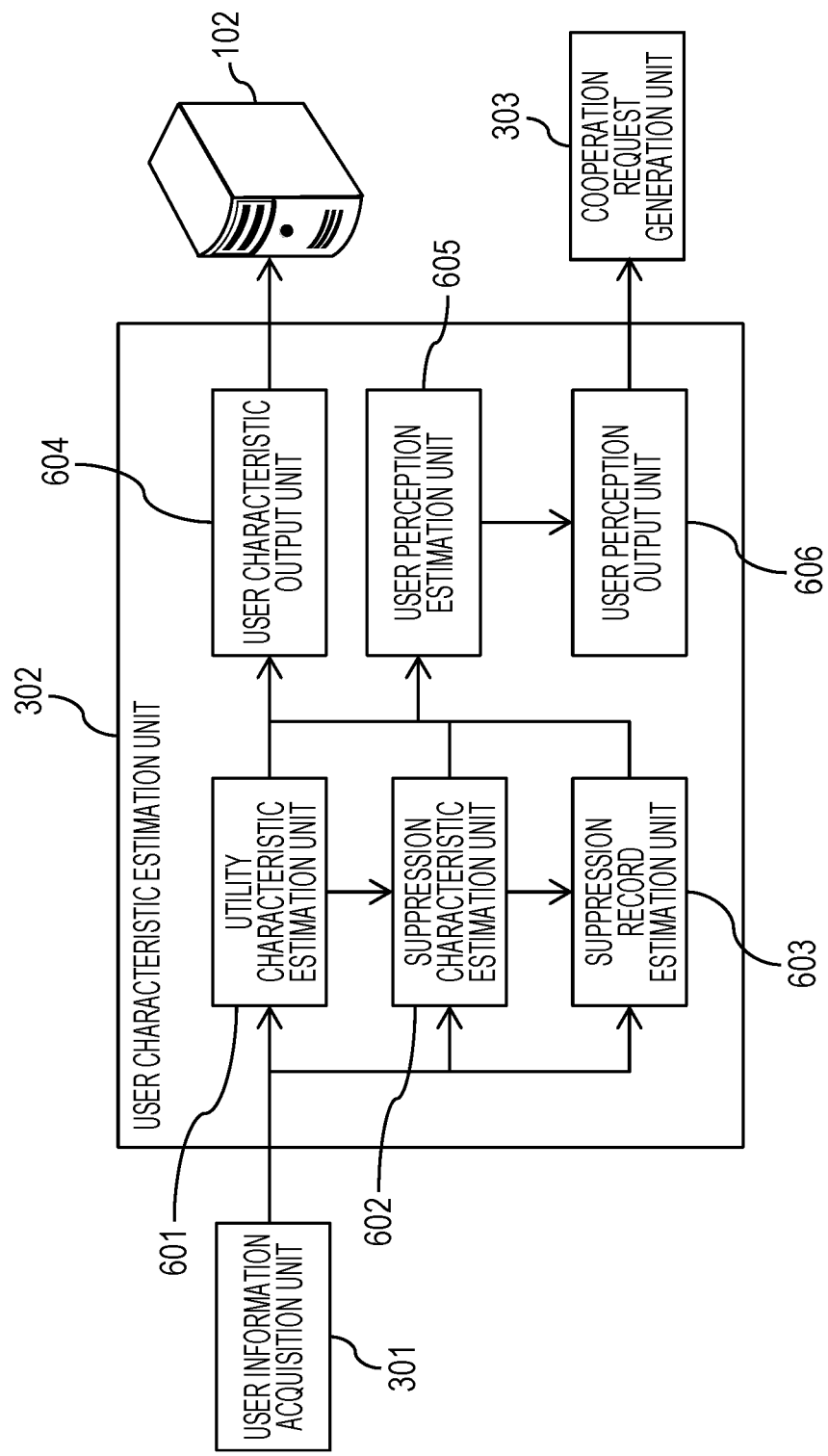
FIG. 6 is a block diagram illustrating a detailed functional configuration example of a user characteristic estimation unit illustrated in FIG. 3.

FIG. 6 is a block diagram illustrating a detailed functional configuration example of the user characteristic estimation unit 302 illustrated in FIG. 3. The user characteristic estimation unit 302 includes a utility characteristic estimation unit 601, a suppression characteristic estimation unit 602, a suppression record estimation unit 603, a user characteristic output unit 604, a user perception estimation unit 605, and a user perception output unit 606. The utility characteristic estimation unit 601 estimates a utility characteristic U based on the user information from the user information acquisition unit 301. The suppression characteristic estimation unit 602 estimates a suppression characteristic S based on the user information from the user information acquisition unit 301.

Figure 7:
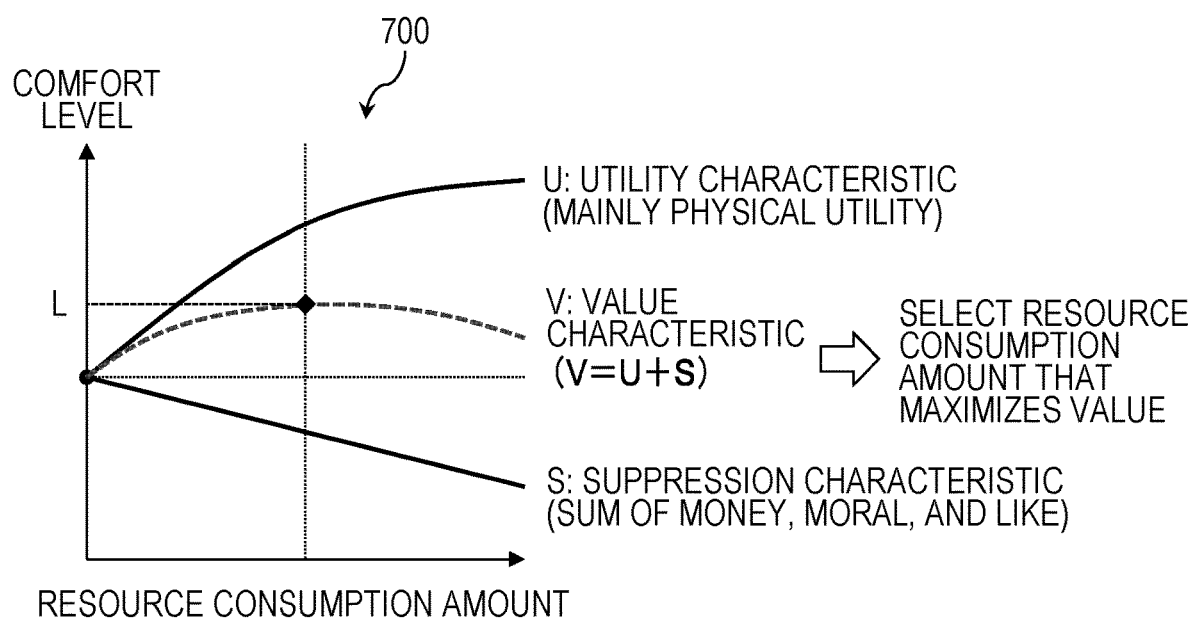
FIG. 7 is a graph describing a relationship between resource consumption amount and a comfort level.

FIG. 7 is a graph describing a relationship between the resource consumption amount and a comfort level. In the graph 700 of FIG. 7, a horizontal axis represents the resource consumption amount, and a vertical axis represents comfort levels of the utility characteristic U and the suppression characteristic S. The vertical axis represents the normalized comfort levels of the utility characteristic U and the suppression characteristic S since units of the utility characteristic U and the suppression characteristic S are different. The utility is a subjective satisfaction level that the user yi obtains by consuming a resource, that is, a comfort level, and is, for example, a level that allows the user yi to feel comfortable at the time of using air conditioning equipment. The utility characteristic U is a function indicating a characteristic where the utility increases as the resource consumption amount increases.

The suppression is a comfort level of subjective satisfaction that the user yi obtains by reducing resource consumption, and is, for example, a level that allows the user yi to feel economical and environmentally friendly due to a decrease in electricity charge at the time of refraining the use of air conditioning equipment. The suppression characteristic S is a function indicating a characteristic where the comfort level of the utility increases as the resource consumption amount decreases.

A value characteristic V is a composite function of the utility characteristic U and the suppression characteristic S, that is, a sum. The resource consumption amount acquisition unit 503 acquires the resource consumption amount with a maximum value of the value characteristic V.

The suppression record estimation unit 603 estimates a suppression record based on the user information from the user information acquisition unit 301. The suppression record is acquired by the question Q3. For example, if the answer to the question Q3 is that a percentage of money is 65%, the remaining 35% corresponds to the other.

Figure 8A:
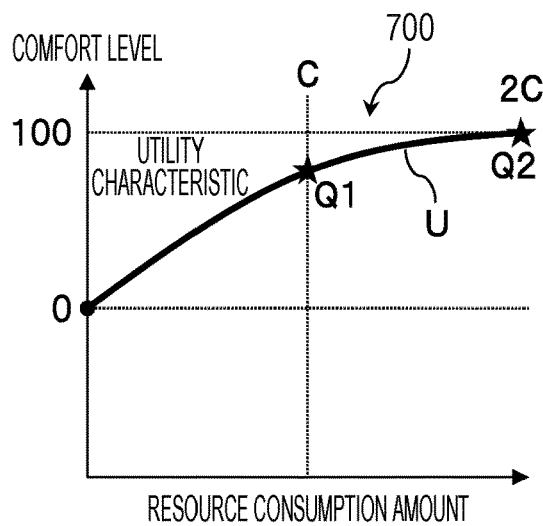
FIGS. 8A to 8C are explanatory views illustrating estimation examples of a utility characteristic, a suppression characteristic, and a suppression record according to the first embodiment.
Figure 8B:
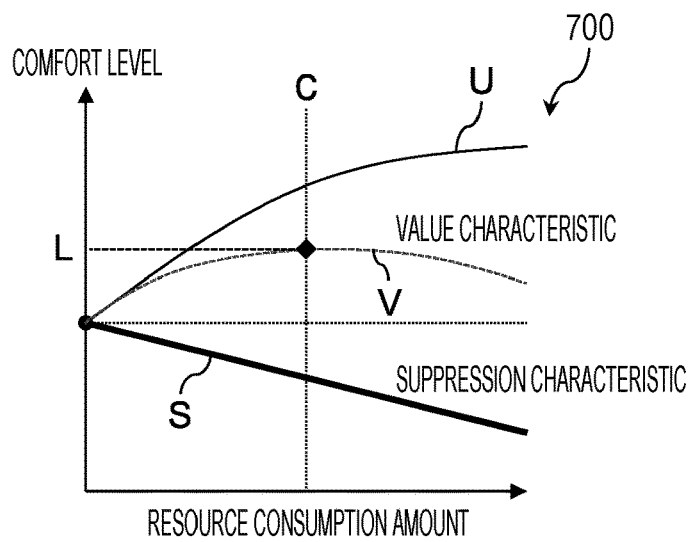
Figure 8C:
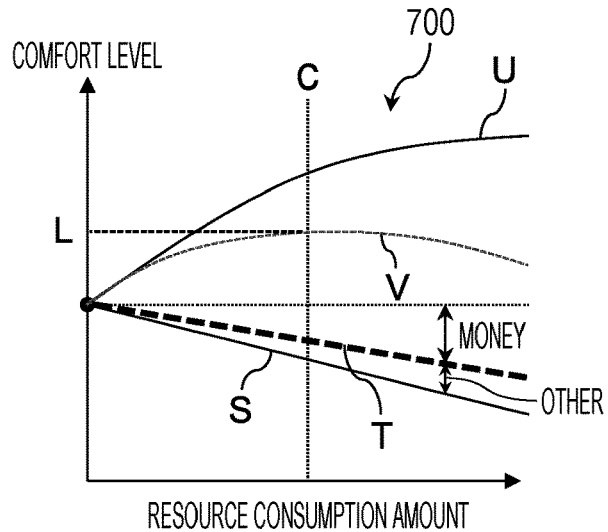

FIGS. 8A to 8C are explanatory views illustrating estimation examples of the utility characteristic U, the suppression characteristic S, and the suppression record according to the first embodiment. In FIG. 8A, a point Q1 is a coordinate value of a resource consumption amount C corresponding to the answer (for example, 80%) of the question Q1. A point Q2 is a coordinate value of a resource consumption amount 2C corresponding to the answer (for example, double) to the question Q2. The utility characteristic estimation unit 601 generates a function of the utility characteristic U connecting a point 0, the point Q1, and the point Q2.

In FIG. 8B, the suppression characteristic estimation unit 602 estimates a slope of the suppression characteristic S such that the maximum value of the value characteristic V becomes C. In FIG. 8C, the suppression record estimation unit 603 adjusts the slope of the suppression characteristic S according to the answer to the question Q3, and generates a suppression characteristic T.

Returning to FIG. 6, the user characteristic output unit 604 outputs user characteristic data to the target calculation device 102 based on the estimation results of the utility characteristic estimation unit 601, the suppression characteristic estimation unit 602, and the suppression record estimation unit 603. Specifically, for example, the user characteristic output unit 604 outputs a maximum value L of the value characteristic V and a comfort level at the maximum value L to the target calculation device 102 as the user characteristic data.

The user perception estimation unit 605 estimates a perception of the user yi related to the resource consumption based on the estimation results of the utility characteristic estimation unit 601, the suppression characteristic estimation unit 602, and the suppression record estimation unit 603. The perception of the user yi is an evaluation of the user yi relative to a household average regarding values such as the resource consumption amount, the comfort level, a suppression tendency, and a monetary ratio.

FIG. 9 is an explanatory view illustrating an example of a user perception estimation table. A user perception estimation table 900 has a value 901 and an estimation result 902. The value 901 includes a resource consumption amount 911, a comfort level 912, a suppression tendency 913, and a monetary ratio 914. The resource consumption amount 911 is the maximum value L of the value characteristic V on the horizontal axis of the graph 700. The comfort level 912 is a value on the vertical axis of the graph 700 at the maximum value L of the value characteristic V.

The suppression tendency 913 is a slope of the suppression characteristic S. The monetary ratio 914 is a value of the answer to the question Q3. In the resource consumption amount 911, the comfort level 912, the suppression tendency 913, and the monetary ratio 914, "large" and "small" are relative evaluation values of the user yi with respect to the household average. Each household average of the resource consumption amount 911, the comfort level 912, the suppression tendency 913, and the monetary ratio 914 may be, for example, a fixed value or a latest value calculated and distributed by the target calculation device 102.

The estimation result 902 includes a user perception 921 and a type 922. The user perception 921 is a perception of the user yi corresponding to the value 901. The type 922 is identification information that defines the user perception 921. The user perception estimation unit 605 outputs the estimation result 902 corresponding to a combination of values of the resource consumption amount 911, the comfort level 912, the suppression tendency 913, and the monetary ratio 914 in the value 901.

Returning to FIG. 6, the user perception output unit 606 outputs the user perception to the cooperation request generation unit 303. Specifically, for example, the user perception output unit 606 outputs the estimation result 902 acquired using the user perception estimation table 900 in FIG. 9 to the cooperation request generation unit 303.

Figure 10:
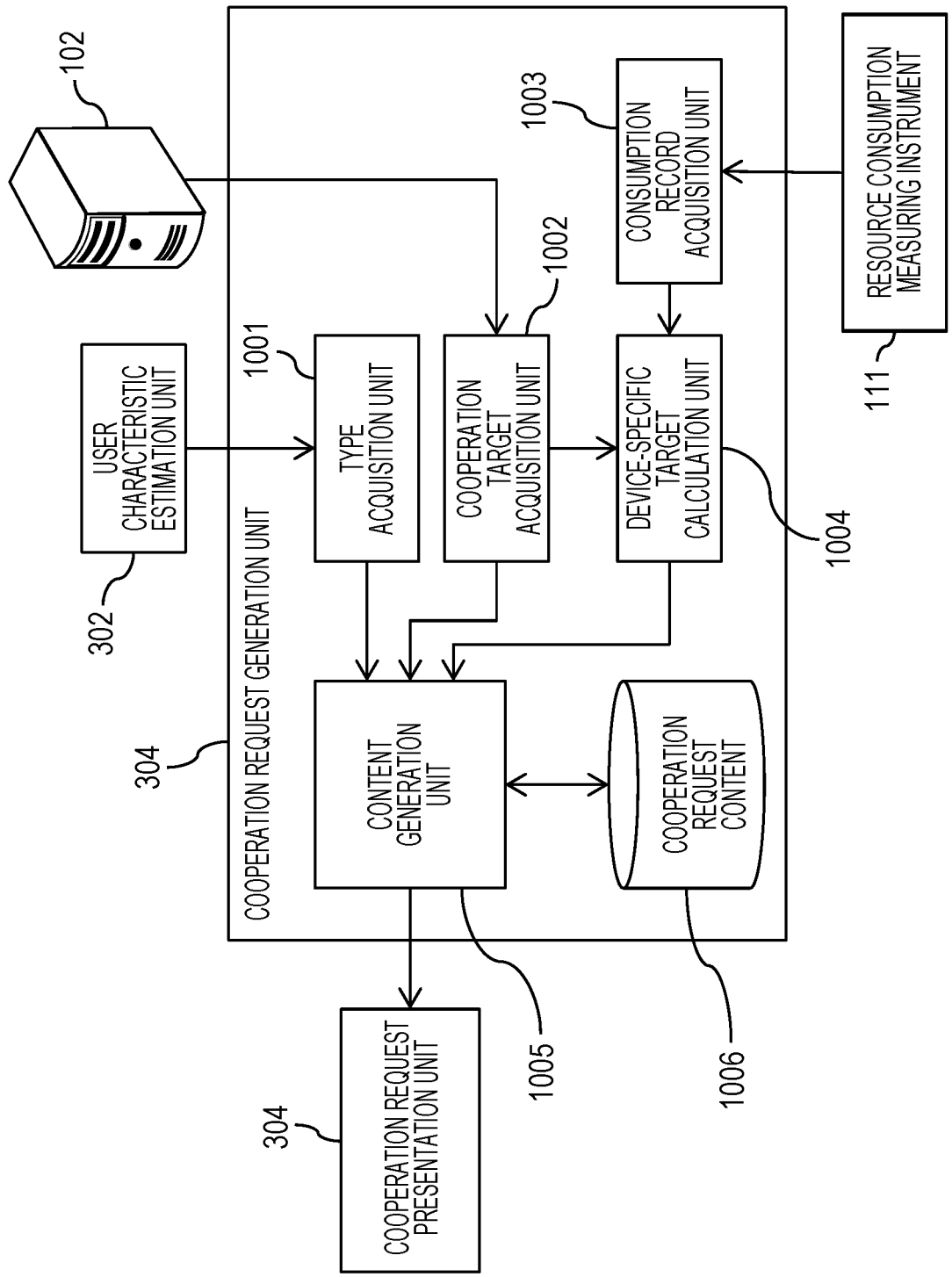
FIG. 10 is a block diagram illustrating a detailed functional configuration example of a cooperation request generation unit illustrated in FIG. 3.

FIG. 10 is a block diagram illustrating a detailed functional configuration example of the cooperation request generation unit 303 illustrated in FIG. 3. The cooperation request generation unit 303 includes a type acquisition unit 1001, a cooperation target acquisition unit 1002, a consumption record acquisition unit 1003, a device-specific target calculation unit 1004, a content generation unit 1005, and a cooperation request content 1006.

The type acquisition unit 1001 acquires the type 922 from the user characteristic estimation unit 302. The cooperation target acquisition unit 1002 acquires a cooperation target value from the target calculation device 102. The cooperation target value is a request that includes a reduction target value of a resource consumption amount such as "please reduce 100 [W] at the resource consumer zi". The consumption record acquisition unit 1003 acquires a measurement result for each resource consumption device from the resource consumption measuring instrument 111.

The device-specific target calculation unit 1004 calculates the reduction target value of the resource consumption amount for each resource consumption device based on the measurement result for each resource consumption device from the resource consumption measuring instrument 111 and the cooperation target value acquired by the cooperation target acquisition unit 1002. The device-specific target calculation unit 1004 may evenly divide the cooperation target value by the number of resource consumption devices or may set a weight in advance for each resource consumption device and divide the cooperation target value according to the weight.

The content generation unit 1005 generates a content by referring to the cooperation request content 1006 based on the type 922 acquired by the type acquisition unit 1001 and the cooperation target value from the target calculation device 102 acquired by the cooperation target acquisition unit 1002.

Figure 11:
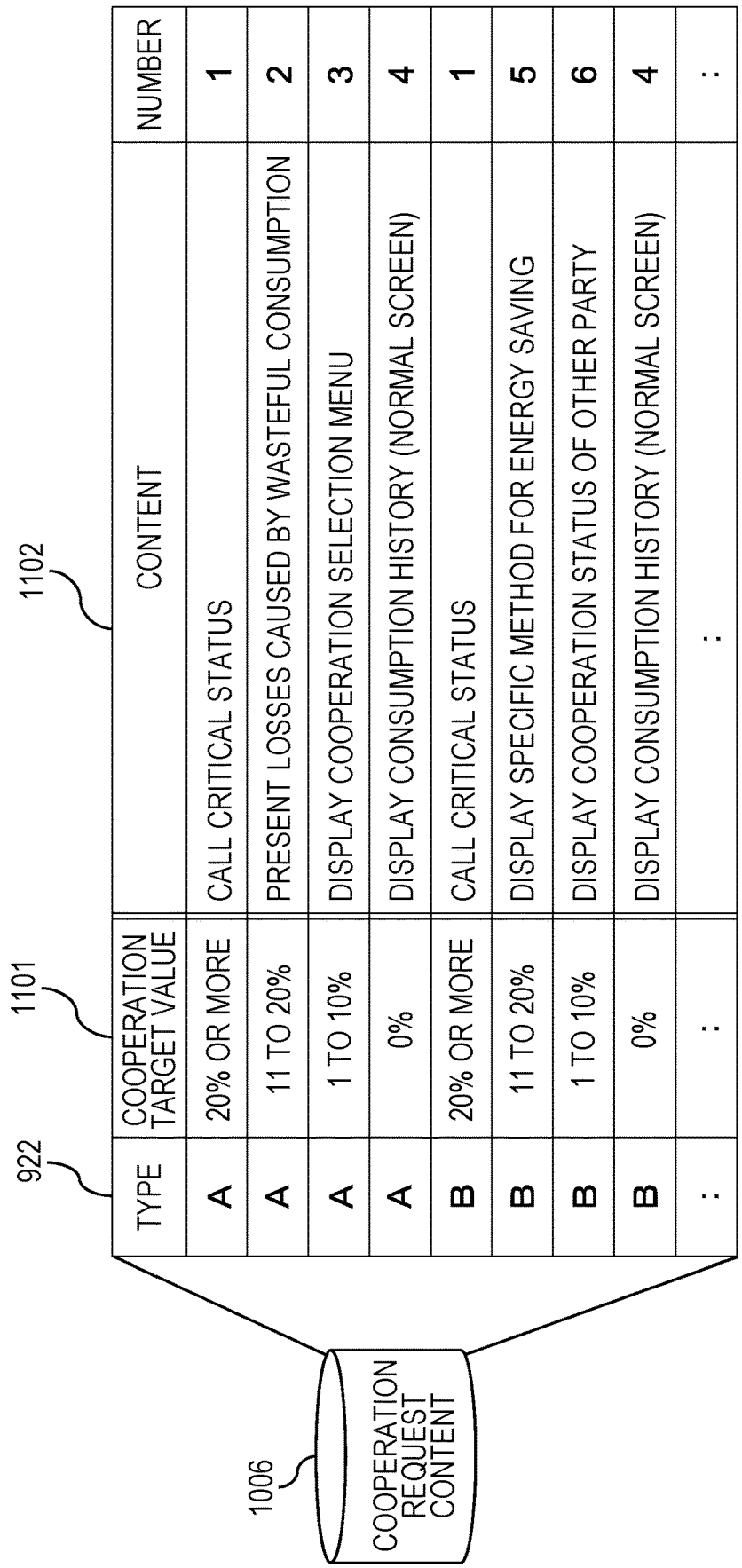
FIG. 11 is an explanatory view illustrating an example of a cooperation request content illustrated in FIG. 10.

FIG. 11 is an explanatory view illustrating an example of the cooperation request content 1006 illustrated in FIG. 10. The cooperation request content 1006 is a table stored in the storage device 202. The cooperation request content 1006 includes a type 922, a cooperation target value 1101, and a content 1102.

The cooperation target value 1101 is the cooperation target value from the target calculation device 102 acquired by the cooperation target acquisition unit 1002. The content generation unit 1005 extracts the content 1102, which corresponds to the type 922 acquired by the user characteristic acquisition unit and the cooperation target value 1101 from the target calculation device 102 acquired by the cooperation target acquisition unit 1002, from the cooperation request content 1006, and outputs the type 922, the cooperation target value 1101, the content 1102 (hereinafter, content data), and the reduction target value of the resource consumption amount for each resource consumption device to the cooperation request presentation unit 304.

Figure 12:
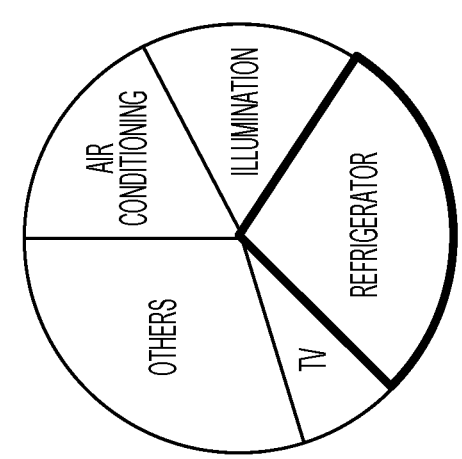
FIGS. 12 and 13 are explanatory views illustrating examples of cooperation request data presented from a cooperation request presentation unit.
Figure 13:
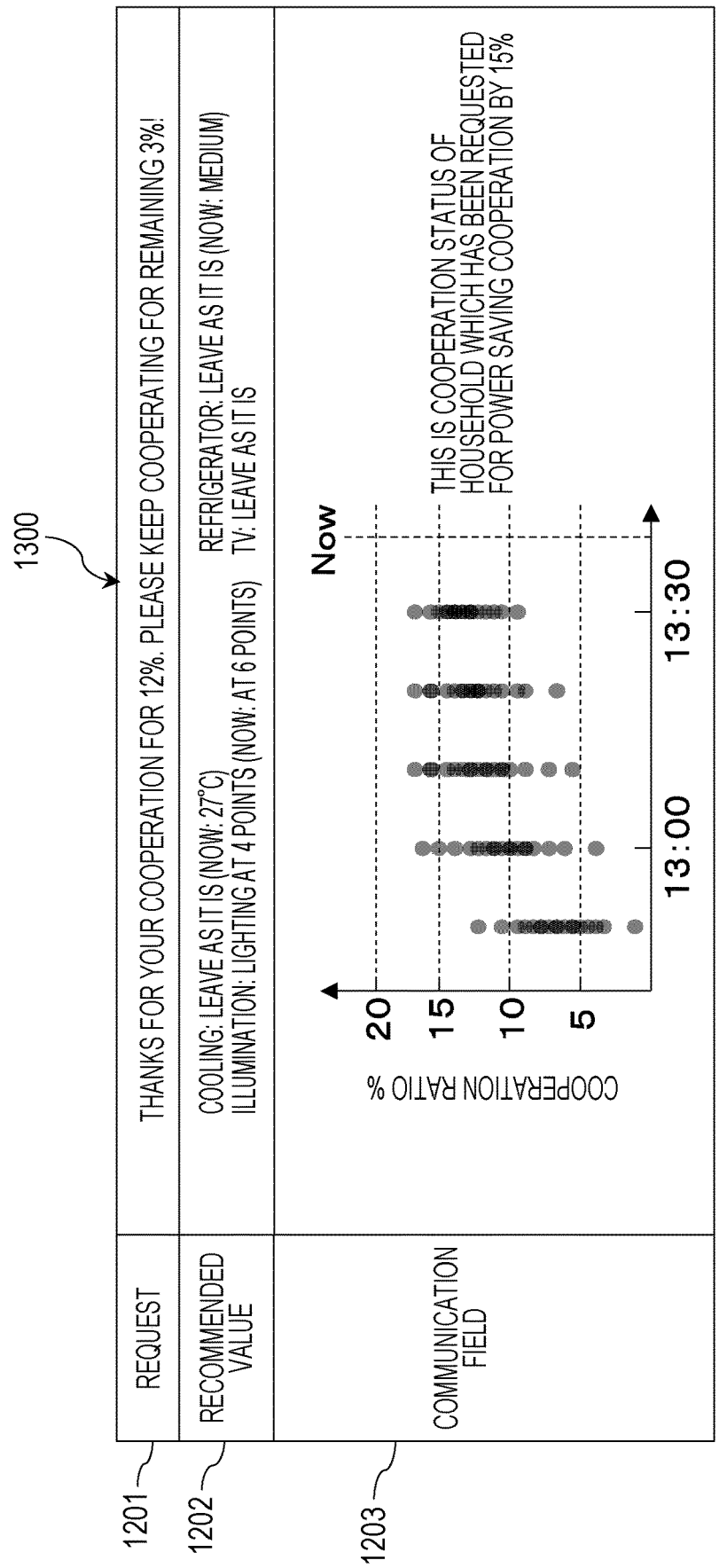

FIGS. 12 and 13 are explanatory views illustrating examples of the cooperation request data presented from the cooperation request presentation unit 304. In FIGS. 12 and 13, cooperation request data 1200 and 1300 are displayed on a screen by the output device 204 or transmitted so as to be displayed on a computer (for example, a smartphone of the user yi) that can communicate with the information processing device 113. The cooperation request data 1200 is cooperation request data related to content data with the type 922 of "B" and a number of "5". The cooperation request data 1300 is cooperation request data related to content data with the type 922 of "B" and a number of "6".

Each of the cooperation request data 1200 and 1300 includes a cooperation request 1201, a recommended value 1202, and a communication field 1203. The cooperation request 1201 is a character string related to a cooperation request based on the cooperation target value 1101 and the content 1102. The recommended value 1202 is a character string related to the reduction target value of the resource consumption amount for each resource consumption device. The communication field 1203 is information determined according to the content 1102. In the cooperation request data 1200, a measurement result and advice for each resource consumption device from the resource consumption measuring instrument 111 are displayed as an example of a "specific method for energy saving" which is the content 1102. In the cooperation request data 1300, "a cooperation status of another party" which is the content 1102 is displayed.

Incidentally, the cooperation request 1201, the recommended value 1202, and the communication field 1203 are displayed in the cooperation request data 1200 and 1300, but at least one of the cooperation request 1201, the recommended value 1202, and the communication field 1203 may be displayed. In this case, the resource management system 100 does not need to generate the data that has not been displayed. Specifically, for example, the resource management system 100 does not need to have a function of generating the data that has not been displayed.

<Functional Configuration Example of Target Calculation Device 102>

Figure 14:
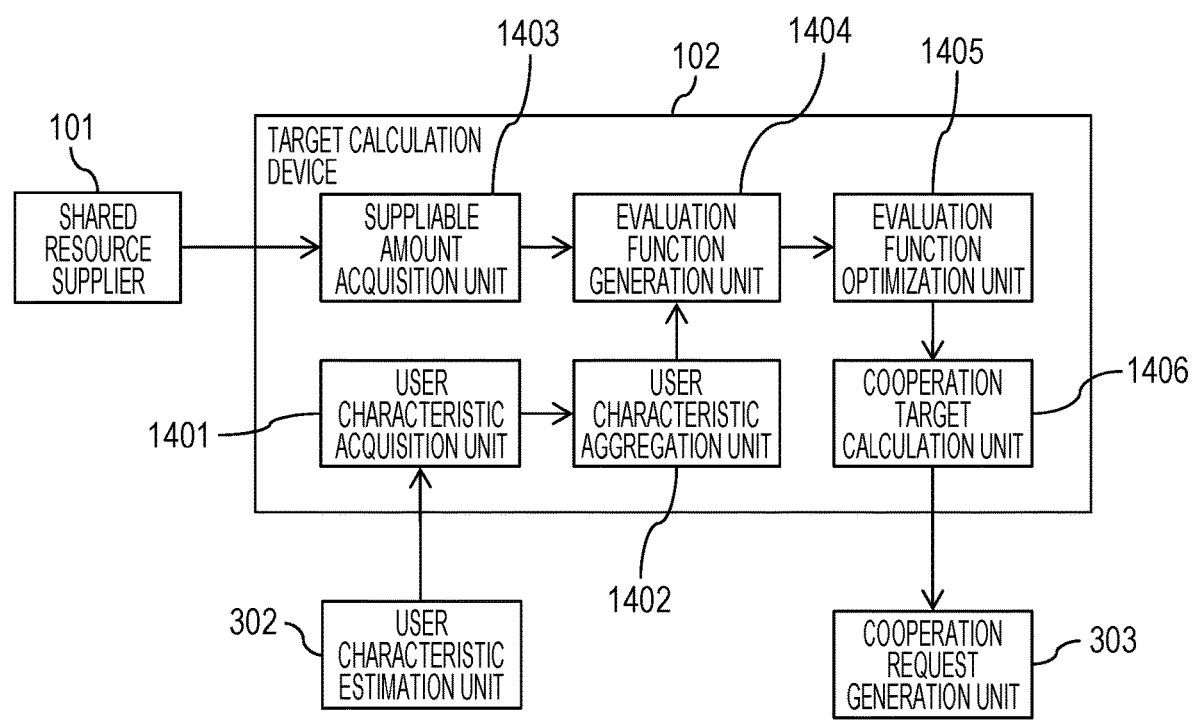
FIG. 14 is a block diagram illustrating a functional configuration example of a target calculation device.

FIG. 14 is a block diagram illustrating a functional configuration example of the target calculation device 102. The target calculation device 102 includes a user characteristic acquisition unit 1401, a user characteristic aggregation unit 1402, a suppliable amount acquisition unit 1403, an evaluation function generation unit 1404, an evaluation function optimization unit 1405, and a cooperation target calculation unit 1406.

The user characteristic acquisition unit 1401 acquires the comfort level at the maximum value L of the value characteristic V as the user characteristic data output from the user characteristic output unit 604 of the user characteristic estimation unit 302. The user characteristic aggregation unit 1402 aggregates the comfort levels at the maximum values L of the value characteristics V from the respective information processing devices 113, and outputs an aggregated result to the evaluation function generation unit 1404. The suppliable amount acquisition unit 1403 acquires a suppliable amount from the shared resource supplier 101. When the shared resource supplier 101 is a power plant, the suppliable amount is a total planned amount of power generation of the resource consumers z1 to zn.

The evaluation function generation unit 1404 generates an evaluation function E of the following Formula (1) based on the suppliable amount from the suppliable amount acquisition unit 1403 and the aggregated result from the user characteristic aggregation unit 1402.

[Formula 1]

$$E = \max_{x_i} \left\{ \sum_{i=1}^{n} f_i(x_i) - A g\left(\sum_{i=1}^{n} x_i, X_L\right) \right\} \quad (1)$$

In Formula (1), n is a total number of the resource consumer zi, xi is a resource consumption amount of the resource consumer zi, fi is the value characteristic V of the resource consumer zi, A is a coefficient, XL is a suppliable amount from the shared resource supplier 101, and g( ) is a penalty function for a total resource use amount (Σxi). For example, this function (for example, a ramp function) takes a large value if the total resource use amount (Σxi)>the suppliable amount XL, and becomes 0 otherwise.

The evaluation function E is a function that determines the resource consumption amount xi of the user yi that maximizes the utility of the user yi. The first term (Σfi(xi)) in the parentheses on the right side indicates the aggregated result of the comfort levels of the resource consumers z1 to zn obtained by the user characteristic aggregation unit 1402, and the comfort level of the resource consumers z1 to zn increases when the term is larger. Since the second term in the parentheses on the right side is the penalty function as described above, the evaluation function E is a function that maximizes the comfort level of the resource consumers z1 to zn at a degree that does not exceed the suppliable amount XL from the shared resource supplier 101.

The evaluation function optimization unit 1405 optimizes the evaluation function E generated by the evaluation function generation unit 1404. Specifically, for example, the evaluation function optimization unit 1405 generates a combination of the resource consumption amounts X1 to Xn that maximizes the evaluation function E.

The cooperation target calculation unit 1406 calculates a cooperation target value, and outputs the cooperation target value to the cooperation request generation unit 303 of the information processing device 113. The cooperation target value is, for example, a difference between the resource consumption amount Xi and the resource consumption amount xi. If xi>Xi, suppression of the resource consumption amount for (xi−Xi) is requested. If xi=Xi, a current status is maintained. If xi<Xi, there is a surplus of the resource consumption amount for (Xi−xi).

<Example of Resource Management Sequence>

Figure 15:
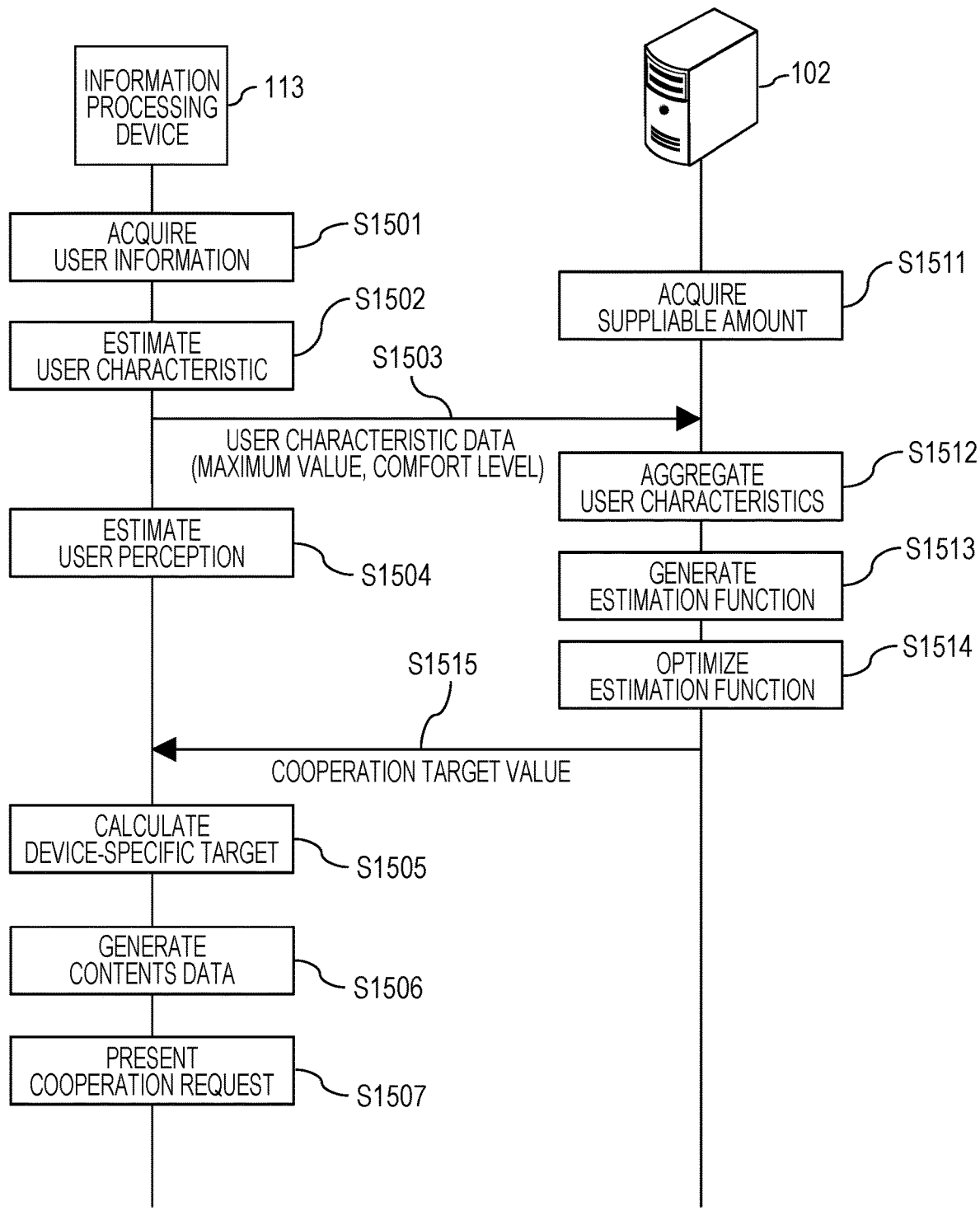
FIG. 15 is a sequence diagram illustrating an example of a resource management sequence of the resource management system.

FIG. 15 is a sequence diagram illustrating an example of a resource management sequence of the resource management system 100. The information processing device 113 acquires the user information using the user information acquisition unit 301 (Step S1501), estimates the user characteristic using the user characteristic estimation unit 302 (Step S1502), and transmits the user characteristic data to the target calculation device 102 (Step S1503).

The target calculation device 102 acquires the suppliable amount XL using the suppliable amount acquisition unit 1403 (Step S1511), and aggregates the user characteristic data from the information processing device 113 using the user characteristic aggregation unit 1402 (Step S1512). Then, the target calculation device 102 generates the evaluation function E using the maximum value L of the resource consumption amount from each of the information processing devices 113, the suppliable amount XL acquired in Step S1511, and the aggregated result aggregated in Step S1515 (Step S1513). Then, the target calculation device 102 optimizes the evaluation function E, calculates the cooperation target value for each of the users yi (Step S1514), and transmits the cooperation target value to the information processing device 113 (Step S1515).

The information processing device 113 estimates the user perception using the user perception estimation unit 605 based on the estimation results of the utility characteristic estimation unit 601, the suppression characteristic estimation unit 602, and the suppression record estimation unit 603 (Step S1504). Next, the information processing device 113 calculates the reduction target value of the resource consumption amount for each resource consumption device using the device-specific target calculation unit 1004 based on the measurement result for each resource consumption device from the resource consumption measuring instrument 111 and the cooperation target value acquired by the cooperation target acquisition unit 1002 (Step S1505).

Then, the information processing device 113 generates content data (the type 922, the cooperation target value 1101, and the content 1102) by referring to the cooperation request content 1006 based on the type 922 acquired by the type acquisition unit 1001 and the cooperation target value from the target calculation device 102 (Step S1506). Thereafter, the information processing device 113 outputs the cooperation request data 1200 and 1300 in a displayable manner using the content data in Step S1506 and the reduction target value of the resource consumption amount for each resource consumption device in Step S1505.

In this manner, it is possible to present incentives that match individual perceptions for individual saving targets and achievement of saving taking the utility of the entire community to which the users yi belong into account according to the first embodiment. Further, even if the value characteristic V is discontinuous, the saving target value can be calculated at high speed and with high accuracy.

Second Embodiment

A second embodiment is an example of a case where the user information acquisition unit 301 does not present a question to the user yi and acquire an answer in the first embodiment. The common parts with the first embodiment will not be described while being denoted by the same reference signs in the description of the second embodiment.

Figure 16:
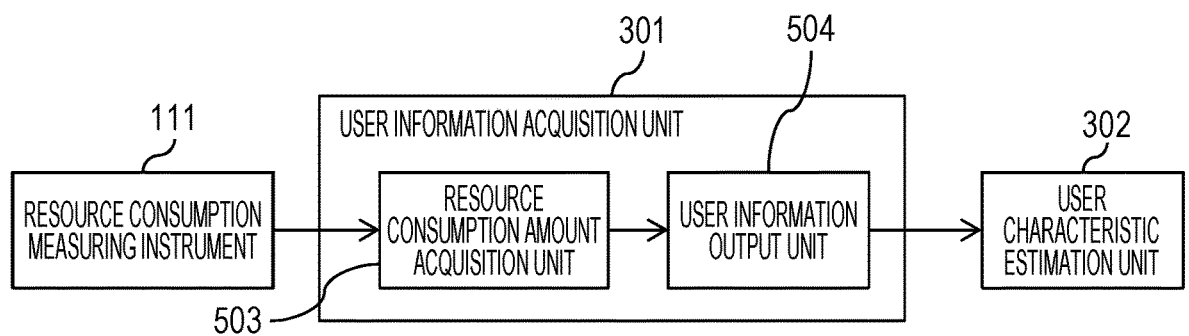
FIG. 16 is a block diagram illustrating a functional configuration example of a user information acquisition unit according to a second embodiment.

FIG. 16 is a block diagram illustrating a functional configuration example of the user information acquisition unit 301 according to the second embodiment. In FIG. 16, the user information acquisition unit 301 does not include the question presentation unit 501 and the answer acquisition unit 502. However, the resource consumption amount acquisition unit 503 acquires a first resource consumption amount C1 from the resource consumption measuring instrument 111, acquires a second resource consumption amount C2 in a different environment (for example, temperature) from the first resource consumption amount C1 from the resource consumption measuring instrument 111, and acquires a third resource consumption amount C3 in a different price system from the first resource consumption amount C1 from the resource consumption measuring instrument 111.

Figure 17A:
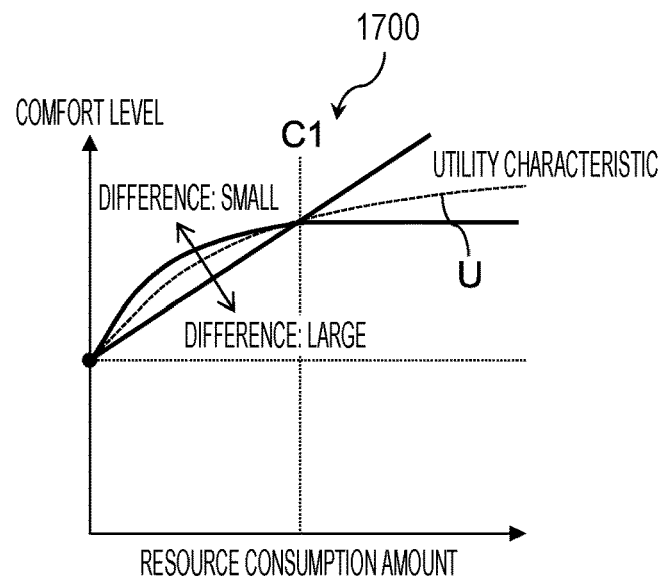
FIGS. 17A to 17C are explanatory views illustrating estimation examples of a utility characteristic, a suppression characteristic, and a suppression record according to the second embodiment.
Figure 17B:
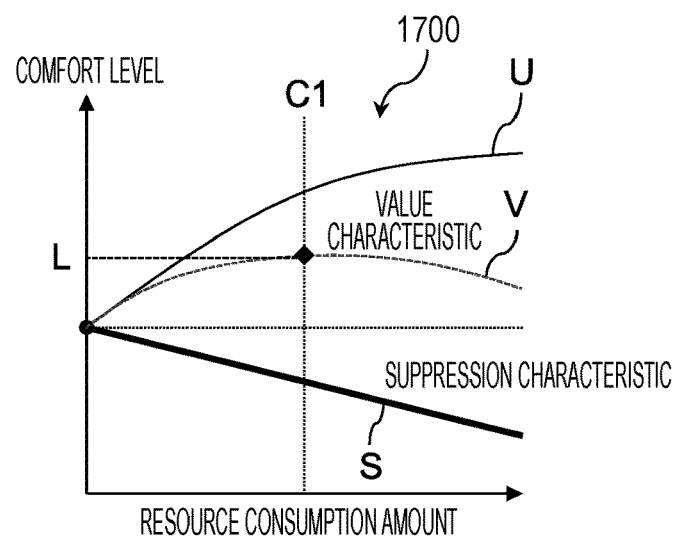
Figure 17C:
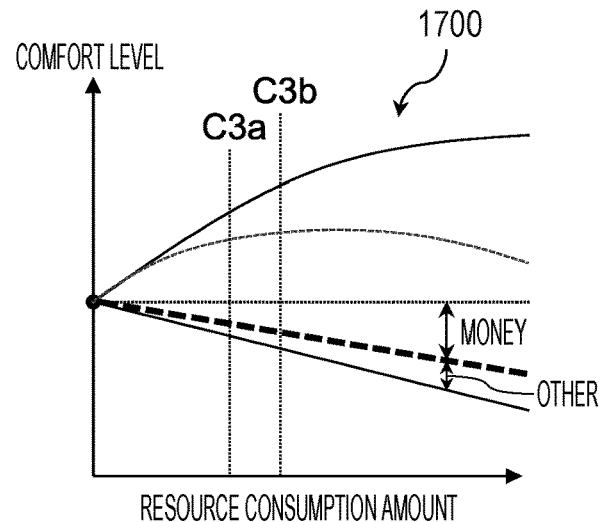

FIGS. 17A to 17C are explanatory views illustrating estimation examples of the utility characteristic U, the suppression characteristic S, and a suppression record according to the second embodiment. In FIG. 17A, the utility characteristic estimation unit 601 compares a difference between the first resource consumption amount C1 and the second resource consumption amount C2 with an average difference between the first resource consumption amount C1 and the second resource consumption amount C2 of all users y1 to yn, and estimates a curve of the utility characteristic U.

The larger a gap between the difference between the first resource consumption amount C1 and the second resource consumption amount C2 and the average difference becomes, the smaller the curve of the utility characteristic U becomes. Specifically, for example, the utility characteristic estimation unit 601 sets U as a model of the utility characteristic U, and determines the utility characteristic U by increasing the curve of the utility characteristic model as the gap between the difference between the first resource consumption amount C1 and the second resource consumption amount C2 and the average difference decreases, and decreasing the curve of the utility characteristic model as the gap between the difference between the first resource consumption amount C1 and the second resource consumption amount C2 and the average difference increases.

In FIG. 17B, the utility characteristic estimation unit 601 estimates a slope of the suppression characteristic S such that a maximum position of the value characteristic V becomes C1. Specifically, for example, the utility characteristic estimation unit 601 calculates a resource consumption index Rt of the user yi of a target household using the following Formula (2).

[Formula 2]

$$Rt = \frac{1}{M}\sum_{j=1}^{M}\frac{Ct_j}{Cm_j} \quad (2)$$

However, M is the total number of measured environments, Ctj is a resource consumption amount of the user yi of the target household in a certain environment j, and Cmj is an average resource consumption amount of users yi of other households in the certain environment j.

Next, the utility characteristic estimation unit 601 calculates a utility value Ut of the user yi of the target household using the following Formula (3).

[Formula 3]

$$Ut = Ub \times (Rt)^a \quad (3)$$

However, Ub is a utility reference value (for example, a fixed value such as 75) and a is a constant (for example, 0.415). When Rt=2, Ut=100. At this time, the resource consumption amount (Q2 in FIGS. 8A to 8C) required for 100% utility is, for example, assumed to be double. As a result, Ut(Q1)=Ut(C1) and Ut(Q2)=Ut(C2) are determined so that the suppression characteristic estimation unit 602 can estimate the suppression characteristic S similarly to the case of FIG. 8B.

In FIG. 17C, the suppression record estimation unit 603 obtains an estimated value C3a of a third resource consumption amount C3 assuming the monetary ratio of 100%, and estimates money and other records based on the difference between the estimated value C3a and an actually measured value C3b of the third resource consumption amount C3.

Figure 18A:
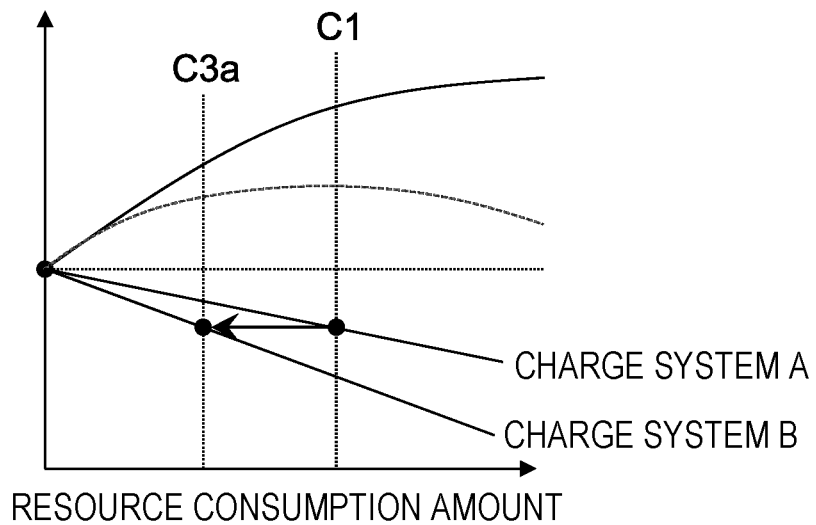
FIGS. 18A and 18B are detailed explanatory views of FIG. 17C.
Figure 18B:
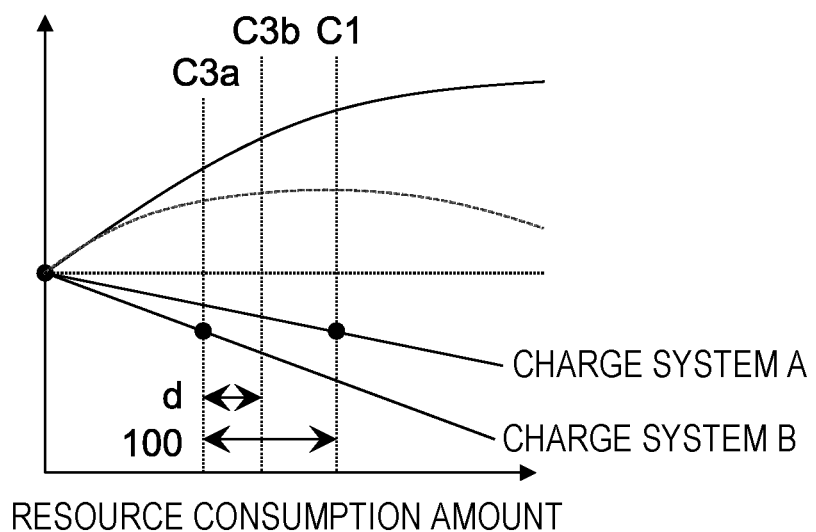

FIGS. 18A and 18B are detailed explanatory views of FIG. 17C. In FIG. 18A, the suppression record estimation unit 603 estimates the monetary ratio. Specifically, for example, assuming that the first resource consumption amount is C1 in a charge system A, the suppression record estimation unit 603 estimates the estimated value C3a of the third resource consumption amount C3 when the monetary reason is 100% in a charge system B. For this estimation, for example, a linear function in which price is inversely proportional to a consumption amount is used.

In FIG. 18B, the suppression record estimation unit 603 acquires the actually measured value C3b of the third resource consumption amount C3 in the charge system B, and compares the estimated value C3a and the actually measured value C3b. Another factor is a difference d between the estimated value C3a and the actually measured value C3b when a difference between the first resource consumption amount C1 and the estimated value C3a is 100.

In this manner, a cooperation request can be automatically presented without presenting a question to the user yi according to the second embodiment.

Incidentally, the present invention is not limited to the above-described embodiments, and may include various modifications and equivalent configurations that fall within the scope of the appended claims. For example, the above-described embodiments have been described in detail in order to describe the present invention in an easily understandable manner, and the present invention is not necessarily limited to one including the entire configuration that has been described above. Further, a part of the configuration of a certain embodiment may be replaced with the configuration of another embodiment. Further, the configuration of a certain embodiment may be added with the configuration of another embodiment. Further, addition, deletion or substitution of other configurations may be made with respect to some configurations of each embodiment.

Further, each configuration, function, processing unit, processing means, and the like described above may be, partially or fully, implemented by hardware, for example, by designing it using an integrated circuit and the like, or implemented by software by causing the processor to interpret and execute a program that implements each function.

The information, such as a program, a table, and a file, to implement each function can be stored in a storage device, such as a memory, a hard disk, and an SSD (Solid State Drive), or a recording medium such as an integrated circuit (IC) card, an SD card, and a digital versatile disc (DVD).

Further, only a control line and an information line considered to be necessary for the description are illustrated, and all the control lines and information lines required for implementation are not necessarily illustrated. In practice, it can be considered that almost all components are interconnected.

What is claimed is:

1. A resource management system, which manages a resource consumed by a plurality of users, comprising:
   an electric power plant generating electric power connected to a power network distributing the electric power;
   a plurality of wattmeters each connected to the power network;
   a plurality of user computers each respectively connected to the wattmeters;
   a plurality of electronic consumption devices each consuming power generated from the electric power plant and respectively connected to each wattmeter;
   a target calculation computer connected to the plurality of user computers via a network, the target calculation computer connected to the electric power plant;
   wherein a first user computer of the plurality of user computers is configured to:
   acquire a resource consumption amount of one or more first electronic consumption devices of the plurality of consumption devices from a first wattmeter connected to the one or more first electronic consumption devices, of the plurality of wattmeters; and
   estimate a utility characteristic related to a utility that the user has obtained with the resource consumption amount and a difference between the utility and a maximum utility, and a suppression characteristic of the user in which the utility decreases as the resource consumption amount increases, based on the resource consumption amount, such that the suppression characteristic has a slope in which a value characteristic, which is a composite function of the suppression characteristic and the estimated utility characteristic, has a maximum value of the utility with the resource consumption amount, estimate a suppression record which is a ratio between a monetary reason suppressing the resource consumption amount and a reason other than the monetary reason, estimate a perception of the user related to consumption of the resource based on the resource consumption amount of the user, the utility characteristic, the suppression characteristic, and the estimated suppression record, wherein the target calculation computer is configured to: calculate a target value related to the resource consumption amount for which the user needs to cooperate based on the estimated utility characteristic and the suppression characteristic, execute an evaluation function generation process of generating an evaluation function to determine a resource consumption amount of the user, which maximizes a utility of the user, based on the resource consumption amount, the maximum value of the utility in the value characteristic, and a suppliable amount from a supply source of the resource, and optimize the resource consumption amount such that the evaluation function is maximized, wherein the target calculation computer is configured to calculate the target value based on the resource consumption amount and an optimization result of the evaluation function optimization process, wherein the first user computer is further configured to:

generate cooperation request data related to reduction of the resource consumption amount for the user based on the target value calculated by the target calculation process and the estimated perception of the user; and display the generated cooperation request data on a display, wherein the first user computer is configured to execute a device-specific target calculation process of calculating a target value for each of one or more of the first electronic consumption devices of the user based on the resource consumption amount of each of the resource consumption devices and the target value, and generate the cooperation request data including a calculation result of the device-specific target calculation process.

2. An information processing device comprising:
a processor that executes a program;
a storage device that stores the program; and
a communication interface, wherein the communication interface is capable of communicating with a target calculation computer that calculates a target value related to a resource consumption amount of a user for which the user of the information processing device needs to cooperate, and the processor executes:

a resource consumption amount acquisition process of acquiring a resource consumption amount of one or more electronic consumption devices from a wattmeter;

a user characteristic estimation process of estimating a utility characteristic related to a utility that the user has obtained with the resource consumption amount and a difference between the utility and a maximum utility, and a suppression characteristic of the user in which the utility decreases as the resource consumption amount increases, based on the resource consumption amount such that the suppression characteristic has a slope in which a value characteristic, which is a composite function of the suppression characteristic and the estimated utility characteristic, has a maximum value of the utility with the resource consumption amount, estimate a suppression record which is a ratio between a monetary reason suppressing the resource consumption amount and a reason other than the monetary reason, estimate a perception of the user related to consumption of the resource based on the resource consumption amount of the user, the utility characteristic, the suppression characteristic, and the estimated suppression record, a cooperation request generation process of generating cooperation request data related to reduction of the resource consumption amount for the user based on the target value transmitted from the target calculation device as a result of transmitting the utility characteristic, the suppression characteristic of the user estimated by the user characteristic estimation process to the target calculation device, the suppression characteristic of the user estimated by the suppression characteristic estimation process to the target calculation device and based on the estimated perception of the user; and display the cooperation request data generated on a display, wherein in the cooperation request generation process, the processor executes a device-specific target calculation process of calculating a target value for each of the one or more electronic consumption devices of the user based on the resource consumption amount of each of the resource consumption devices and the target value, and generate the cooperation request data including a calculation result of the device-specific target calculation process.

3. A resource management method executed by a resource management system that manages a resource consumed by a plurality of users, the resource management system comprising:
an electric power plant generating electric power connected to a power network distributing the electric power;
a plurality of wattmeters each connected to the power network;
a plurality of user computers each respectively connected to the wattmeters;
a plurality of electronic consumption devices each consuming power generated from the electric power plant and respectively connected to each wattmeter;
a target calculation computer connected to the plurality of user computers via a network, the target calculation computer connected to the electric power plant;

the method comprising:
executing, by a first user computer of the plurality of user computers:
a resource consumption amount acquisition process of acquiring a resource consumption amount of one or more first electronic consumption devices of the plurality of consumption devices from a first wattmeter connected to the one or more first electronic consumption devices, of the plurality of wattmeters;
a user characteristic estimation process of estimating a utility characteristic related to a utility that the user has obtained with the resource consumption amount and a difference between the utility and a maximum utility, and a suppression characteristic of the user in which the utility decreases as the resource consumption amount increases, based on the resource consumption amount such that the suppression characteristic has a slope in which a value characteristic, which is a composite function of the suppression characteristic and the estimated utility characteristic, has a maximum value of the utility with the resource consumption amount, estimating a suppression record which is a ratio between a monetary reason suppressing the resource consumption amount and a reason other than the monetary reason, estimating a perception of the user related to consumption of the resource based on the resource consumption amount of the user, the utility characteristic, the suppression characteristic, and the estimated suppression record, executing, by the target calculation computer:

a target calculation process of calculating a target value related to the resource consumption amount for which the user needs to cooperate based on the utility characteristic and the suppression characteristic of the user estimated by the user characteristic estimation process;

executing an evaluation function generation process of generating an evaluation function to determine a resource consumption amount of the user, which maximizes a utility of the user, based on the resource consumption amount, the maximum value of the utility in the value characteristic, and a suppliable amount from a supply source of the resource, and optimizing the resource consumption amount such that the evaluation function is maximized, wherein the target calculation computer is configured to calculate the target value based on the resource consumption amount and an optimization result of the evaluation function optimization process, wherein the first user computer further executes steps of:

a cooperation request generation process of generating cooperation request data related to reduction of the resource consumption amount for the user based on the target value calculated by the target calculation process and the estimated perception of the user; and displaying the cooperation request data generated by the cooperation request generation process on a display, in the cooperation request generation process, the first user computer executes a device-specific target calculation process of calculating a target value for each of the one or more electronic consumption devices of the user based on the resource consumption amount of each of the resource consumption devices and the target value, and generate the cooperation request data including a calculation result of the device-specific target calculation process.

\* \* \* \* \*